United States Patent [19]

Nakagawa et al.

[11] 4,217,051

[45] Aug. 12, 1980

[54] EXPOSURE TIME SETTING DEVICE FOR SHUTTER OF CAMERA

[75] Inventors: Tadashi Nakagawa; Ichiro Nemoto, both of Yotsukaido, Japan

[73] Assignee: Seiko Koki Kabushiki Kaisha, Japan

[21] Appl. No.: 917,197

[22] Filed: Jun. 20, 1978

[30] Foreign Application Priority Data

Jun. 23, 1977 [JP] Japan .................................. 52/74734

[51] Int. Cl.$^2$ .......................... G03B 9/08; G03B 9/64; G03B 17/38
[52] U.S. Cl. .................................. 354/226; 354/237; 354/267
[58] Field of Search ............... 354/266, 267, 226, 236, 354/237, 238, 239, 234, 235, 241, 242, 245-252

[56] References Cited

U.S. PATENT DOCUMENTS

| | | | |
|---|---|---|---|
| 3,657,982 | 4/1972 | Uno et al. | 354/242 |
| 3,721,166 | 3/1973 | Yanagi et al. | 354/242 X |
| 3,825,940 | 7/1974 | Hayami | 354/251 X |
| 3,893,143 | 7/1975 | Taguchi et al. | 354/267 X |
| 3,945,026 | 3/1976 | Hayami | 354/239 X |
| 3,984,848 | 10/1976 | Akiyama et al. | 354/242 X |
| 4,069,491 | 1/1978 | Scholz | 354/267 |

FOREIGN PATENT DOCUMENTS

| | | | |
|---|---|---|---|
| 977643 | 11/1967 | Fed. Rep. of Germany | 354/241 |
| 2640463 | 3/1977 | Fed. Rep. of Germany | 354/237 |

*Primary Examiner*—Donald A. Griffin
*Attorney, Agent, or Firm*—Robert E. Burns; Emmanuel J. Lobato; Bruce L. Adams

[57] ABSTRACT

A camera shutter has a control member movable when the shutter is released for successively actuating an opening member and a closing member to effect the taking of an exposure. A delay mechanism coacts with the control member to effect the selective setting of a range of exposure times including a minimum exposure time by which the control member actuates the opening and closing members without interaction of the delay mechanism, a next to the minimum exposure time by which the control member engages with the delay mechanism prior to actuating the opening and closing members, and one or more longer exposure times by which the control member actuates the opening member and then engages with the delay mechanism prior to actuating the closing member. The engagement of the control member and delay mechanism prior to actuation of the opening and closing members, in the next to the minimum exposure time mode, compensates for unstable motion of the control member at the initial stage of movement thereof under control of the delay mechanism thereby ensuring exposure accuracy.

6 Claims, 2 Drawing Figures

EXPOSURE TIME SETTING DEVICE FOR SHUTTER OF CAMERA

BACKGROUND OF THE INVENTION

This invention relates to an improved exposure time setting device.

Usually, the exposure time control system is so arranged that a control member released by a releasing mechanism releases the opening member first, then after a preset period of time, releases the closing member. There are many kinds of methods for delaying the actuation of the control member on the closing member after it has released the opening member, such as electrical or mechanical, or automatic or manual, depending on the purpose and design. However, none of these prior art methods has proven satisfactory to precisely control the short exposure time next to the minimum exposure time. When quick operation of the exposure system is required, as in the case of a minimum exposure time such as 1/2000 seconds, it is quite difficult to ensure precise exposure time according to the conventional method whereby a control member releases an opening member at the initial stage of its operation and then releases a closing member after delayed movement controlled by a delaying mechanism. In some cases, the short exposure time next to the minimum exposure time can not be discriminated from the minimum exposure time.

SUMMARY OF THE INVENTION

The disadvantages of the conventional methods are overcome according to the present invention which comprises an exposure time setting device so arranged that the control member releases the opening member and the closing member successively without being controlled by the delaying mechanism when the shutter is set at the minimum exposure, and when the shutter is set at the next to the minimum exposure, the control member is controlled by the delay member at the initial stage of its movement and then releases the opening member and the closing member successively.

DETAILED DESCRIPTION OF THE INVENTION

Figure 1:
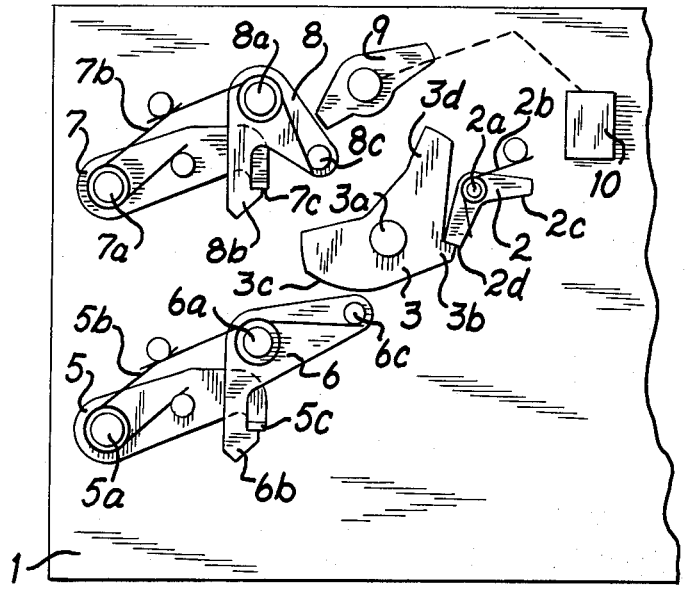
FIG. 1 is a plan view of a preferred embodiment of a camera shutter according to this invention shown in the charged state.

As seen in FIG. 1, a base plate (1) is provided with an exposure aperture, not shown, and shutter operating members. A release lever 2 having an actuating end (2c) and stopping end (2d) is pivotably mounted on a pivot pin (2a) fixed on the base plate (1) and urged clockwise by a spring (2b). A control member (3) is pivotably mounted on a pivot pin (3a), fixed on the base plate (1) and is urged counterclockwise by a spring, not shown, and detained at the charged position by the stopping end (2d) engaging with a prejection (3b) on the control member. The periphery of the control member is constituted of a first control cam (3c) and a second control cam (3d).

An opening member (5) having a curved projection (5c) is pivotably mounted on a pivot pin (5a) fixed on the base plate (1) and urged clockwise by a spring (5b).

An opening member detaining plate (6) is pivotably mounted on a pivot pin (6a) fixed on the base plate (1) and detains the opening member (5) at the charged position by the engagement of a hooked end (6b) with the curved projection (5c) of the opening member (5). A cam follower (6c) which is engageable with the first cam (3c) is provided at one end of the opening member detaining plate (6). A closing member (7) having a curved projection (7c) is pivotably mounted on a pivot pin (7a) fixed on the base plate (1) and urged clockwise by a spring (7b). A closing member detaining plate (8) is pivotably mounted on a pivot pin (8a) fixed on the base plate (1) and detains the closing member (7) at the charged position by the engagement of a hooked end (8b) with the curved projection (7c). A cam follower (8c) which is engageable with the second cam (3d) is provided at one end of the closing member detaining plate (8). A governor (9), the action of which on the second control cam (3d) is adjusted by a well known adjusting means (10) relative to a preferred exposure time, is provided for obtaining a controlled time delay. FIG. 1 shows the governor (9) at its resting position disengaged from the operating range of the second control cam (3d).

Referring to FIG. 1, the operation of the mechanism will now be explained.

The release lever (2) is forced to turn counterclockwise against the spring force provided by the spring (2b) by the actuation of the release button, not shown, of the camera. The control member (3) is turned counterclockwise by a spring, not shown, about the pivot pin (3a) when the projection (3b) of the control member (3) and the stopping end (2d) of the release lever (2) are disengaged.

As the initial stage of rotation of the control member (3), the first control cam (3c) turns the opening member detaining plate (6) about the pivot pin (6a) clockwise by pressing against the cam follower (6c) of the opening member detaining plate (6) to release the opening member (5) by disengaging the curved projection (5c) from the hooked end (6b). The opening member (5) is thereby actuated and turned clockwise about the pivot pin (5a) by the spring (5b) so that the shutter aperture is opened through a well known means for initiating the taking of an exposure. According to continued counterclockwise rotation of the control member 3, the second control cam (3d) turns clockwise the closing member detaining plate (8) about the pivot pin (8a) by pressing against the cam follower (8c) of the closing member detaining plate (8) to release the closing member (7) by disengaging the cured projection (7c) of the closing member (7) from the hooked end (8b) thereby actuating the closing member. Then, the closing member (7) is turned clockwise by the spring (7b) so that the aperture is closed through a well known means thereby completing the exposure.

The explanation stated above is concerned with operation of when the exposure mechanism according to this invention when the exposure time is set at 1/1000 seconds.

Figure 2:
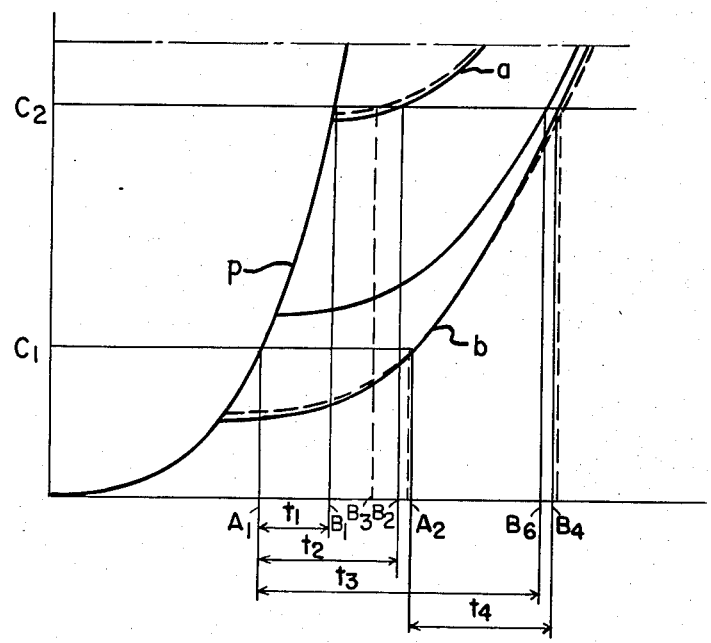
FIG. 2 is an explanatory diagram showing the relationship between the stroke of the control member on the ordinate relative to the lapse of time on the abscissa wherein the curve (P) shows the specific behavior of the control member operating free from the delaying system, the curve (a) shows the behavior of the control member according to the conventional method and the curve (b) shows the delayed behavior of the control member according to this invention. The ordinates C1 and C2 show the strokes of the control member where the opening member and the closing member are released, respectively.

When the exposure mechanism is set to provide an exposure time of 1/250 seconds or longer, a well known governor (9) or the like is so adjusted by a well known adjusting means (10) at the position corresponding to the exposure time that the governor (9) starts working on the second control cam (3d) after the first control cam (3c) of the control member (3) has released the opening member (5) from the opening member detaining plate (6) at a point A1 (FIG. 2) to delay the rotation of the control member (3) so as to release the closing member (7) from the closing member detaining plate (8) at a point B6 (FIG. 2).

When the exposure mechanism is set to provide an exposure time of 1/500 seconds, which is the shortest exposure time next to the minimum exposure time of 1/100 seconds, the governor (9) is adjusted to a well known adjusting means (10) at the deepest position within the working range of the second control cam (3d), while the resistance rate of the governor is set at the minimum. In this state, when the control member (3) is released from the release lever (2), counterclockwise rotation of the control member (3) is controlled by engagement with the governor (9) with the second control cam (3d). After some controlled rotation, the first control cam (3c) releases the opening member (5) from the opening member detaining plate (6).

The rotation of the control member (3) under control of the governor (9) is not stable at the initial stage. The first control cam (3c) of the control member (3) releases the opening member (5) when the control member (3) rotates within the stabilized rotating range with suppressed accelerating rate under control of the governor (9), then after a delayed time corresponding to the exposure time, the second control cam (3d) releases the closing member (7) from the closing member detaining plate (8) to complete the exposure.

Although the explanation has been made on an embodiment wherein the minimum exposure time is 1/1000 seconds, it is to be understood that the minimum exposure time is not limited to 1/1000 seconds, but that this invention may be practiced even when the minimum exposure time is 1/2000 seconds or shorter as far as stabilized rotation of the control member (3) is ensured.

Referring to FIG. 2, the ordinate axis shows the stroke (or the angle of rotation) of the control member (or the first control cam (3c)) and the abscissa axis shows the time lapsed after the control member (3) is released. The curves (a) and (b) show the operation of the exposure mechanism of the conventional control method and of the present invention, respectively. The curve (P) shown by a thick line illustrates specific operation of the control member wherein the stroke of the control member is shown increasing according to the lapse of time without influence from the governor (9). At the points C1 and C2, the opening member and the closing member are released, respectively. Referring to the curve (P), the opening member is released at a time A1 corresponding to the stroke C1 of the control member. The closing member is released at a time B1 (for instance 1/1000 seconds after A1) corresponding to the stroke C2 of the control member.

In the conventional method, the shorter exposure time (for instance 1/500 seconds) next to the minimum exposure time is controlled according to the delayed curve (a) wherein the closing member is released at a time B2 (for instance 1/500 seconds after A1) corresponding to the stroke C2 of the control member. However, the closing time B2 is likely to deviate widely, for instance to B3, even when there is only a small error in control of the control member by the governor. This method therefore, requires utmost precision for the dimensions of the parts of the mechanism.

In the method according to this invention, the shorter exposure time (for instance 1/500 seconds) next to the minimum exposure is controlled according to the delayed curve (b) wherein the rate of stroke (speed of angular movement of the control member), relative to time increases according to the lapse of time. The shorter exposure time next to the minimum exposure is controlled within the range where the rate of stroke (speed of angular movement) is high and stabilized so that the exposure time is precisely controlled. It will be well understood that the exposure time is more precisely controlled by releasing the opening member at A2 corresponding to the stroke C1 and releasing the closing member at B4 (for instance 1/500 seconds after A2) corresponding to the stroke C2 as shown by the curve (b) than releasing the opening member at A1 corresponding to the stroke C1 and releasing the closing member at B2 (for instance 1/500 seconds after A1) corresponding to the stroke C2.

At the initial stage of operation of the control member under control of the governor, the rate of stroke of the control member is low and unstabilized so that the releasing timing for the opening member and the closing member often deviates as large as 0.4 ms to 0.5 ms, therefore, it is quite difficult and unreliable to discriminate between 1/500 and 1/000 seconds according to the conventional method.

According to this invention, such control range as stated above is applied only to the control of long exposure times such as 1/250 seconds or more, and the range wherein the rate of stroke of the control member is high and stabilized is applied to the control of short exposure time such as 1/500 seconds where even 0.2 ms is a serious error so that exposure time is precisely controlled. The dotted lines show the erroneous stroke deviating from the theoretically correct stroke. It will be well understood that this erroneous stroke of the control member does not affect the exposure time as only the stabilized range is employed for the control of the exposure time according to this invention.

While a preferred embodiment of this invention has been described with reference to controlling methods of 1/500 and 1/1000 seconds of exposure time, the remarkable advantage of the exposure time controlling method of this invention can be applied to the control of exposure times of 1/2000 and 1/1000 seconds.

The adjusting means (10) is not limited only to a manual system, but may comprise an automatic response system interlocked with exposure meters or a servo system.

In accordance with the invention, the short exposure time for high shutter speed range can be controlled by selectively changing the operating timing of the governor member, thereby stabilized control of accurate exposure time is attained without the need of highly precisioned parts as required in the conventional control system or without providing a preliminary operating range for the control member which is essential to the conventional control system.

It may be unnecessary to provide a wide preliminary operating range for the control member when exposure time is 1/250 seconds or longer because the exposure time control error for this long exposure time range due to unstabilized operation of the control member is practically negligible. There are advantages of reducing the size of shutter construction and reducing the shutter charging stroke by narrowing the preliminary operating range for the control member.

We claim:

1. An exposure time setting device for a shutter of a camera including a control member actuated when the shutter is released for releasing successively an opening member and a closing member, said device comprising: means for setting time exposure ranges including a range wherein said control member is controlled and delayed at the beginning of its movement by a delay mechanism which is actuated by the movement of said control member and is adjusted by the exposure setting member so as to delay the movement of the control member within the exposure time setting range, then releases successively said opening member and said closing member; and a range wherein said control member releases said opening member first, then releases said closing member delayed by said delay mechanism.

2. An exposure time setting device as set forth in claim 1, wherein said delay mechanism will not be actuated by the movement of the control member staying at the resting position when said exposure setting device sets the shutter to provide minimum exposure; and when the shutter is set to provide a short exposure next to the minimum exposure, said control member releases said opening member and said closing member successively after a delayed period controlled by said delay mechanism.

3. In a camera shutter of the type having an opening member operative when actuated for initiating the taking of an exposure and a closing member operative when actuated for completing the exposure: a control member movable in a given direction when the shutter is released for successively actuating said opening and closing members; and delay means selectively positionable within a range of positions in accordance with different exposure time settings and coacting with said control member for delaying movement thereof to thereby control the exposure time, said range of positions including a first position, corresponding to a first exposure time, in which said delay means engages with said control member during the course of movement thereof in said given direction prior to said control member actuating said opening and closing members thereby compensating for unstable motion of said control member at the initial stage of movement thereof under control of said delay means to enable taking of an exposure at said first exposure time, and a second position, corresponding to a second exposure time longer than said first exposure time, in which said delay means engages with said control member during the course of movement thereof in said given direction after said control member actuates said opening member but before said control member actuates said closing member to enable taking of an exposure at said second exposure time.

4. In a camera shutter according to claim 3; wherein said range of positions of said delay means includes a third position, corresponding to a third exposure time shorter than said first exposure time, in which said delay means remains out of engagement with said conrol member during the course of movement thereof in said given direction.

5. In a camera shutter according to claim 4; wherein said third exposure time comprises the minimum exposure time setting of the camera, and said first exposure time comprises the next to the minimum exposure time setting of the camera.

6. In a camera shutter according to claim 3, 4 or 5; wherein said control member is mounted for angular movement in said given direction and has a first control cam to effect actuation of said opening member and a second control cam to effect actuation of said closing member during angular movement of said control member; and wherein said delay means includes means mounted for angular movement and configured so as to make camming engagement with said second control cam at different locations therealong according to the selective angular positioning of said delay means in said first and second positions.

* * * * *